(No Model.)
M. A. FOSTER.
APPARATUS FOR CONSUMING THE GASEOUS PRODUCTS OF RENDERING TANKS.
No. 425,314. Patented Apr. 8, 1890.
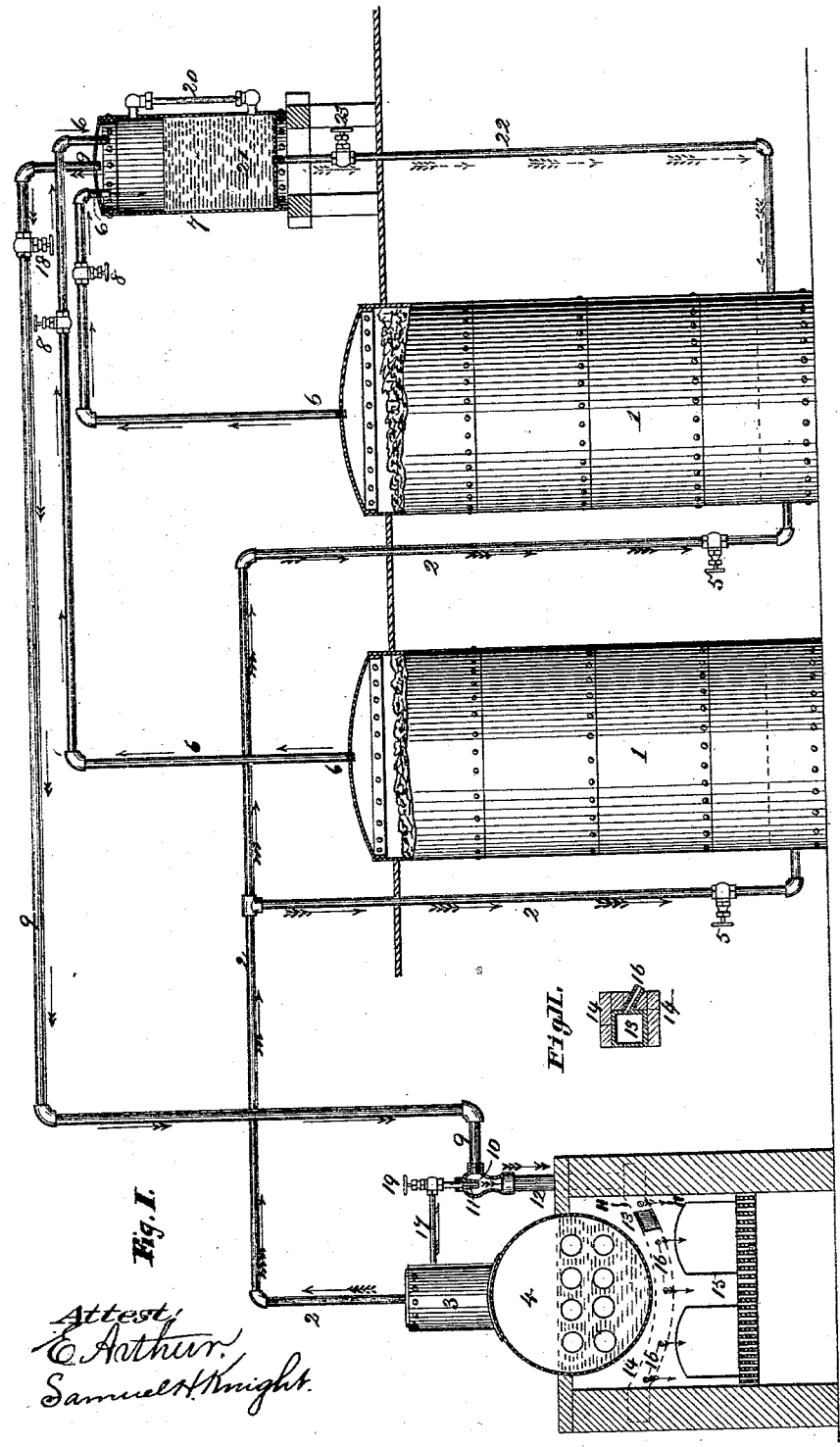

UNITED STATES PATENT OFFICE.

MICHAEL A. FOSTER, OF ST. LOUIS, MISSOURI.

APPARATUS FOR CONSUMING THE GASEOUS PRODUCTS OF RENDERING-TANKS.

SPECIFICATION forming part of Letters Patent No. 425,314, dated April 8, 1890.

Application filed May 16, 1889. Serial No. 310,928. (No model.)

*To all whom it may concern:*

Be it known that I, MICHAEL A. FOSTER, of the city of St. Louis, in the State of Missouri, have invented a certain new and useful Improvement in Apparatus for Consuming the Gaseous Products of Rendering-Tanks, of which the following is a full, clear, and exact description, reference being had to the accompanying drawings, forming part of this specification.

This invention relates to an apparatus by which the gaseous products of rendering-tanks are utilized as fuel in a steam-boiler furnace or other furnace.

Figure I is a view of the apparatus, part in elevation and part in vertical section. Fig. II is an enlarged detail section at II II, Fig. I.

1 1 are rendering-tanks, the contents of which are heated by steam entering them through the pipes 2, which lead from the drum 3 of a steam-boiler 4. The steam-pipes have valves 5. From the top of each tank 1 extends a pipe 6, which leads to settling-tank 7. 8 is a valve in such pipe. From the top of the tank 7 extends a pipe 9, which leads to the chamber 10 of an injector 11, whose discharge-pipe 12 leads to a jet-pipe 13, preferably inclosed in the front wall 14 of the steam-boiler furnace 15. This pipe has a number of jet-nozzles 16, through which the carbonaceous gases, mixed with hot steam, find exit from the pipe 13 into the furnace. The jet-pipe may be arranged in a different part or parts of the furnace-walls, and the gases may issue through simple holes in the pipe.

The steam to work the injector comes through a pipe 17, leading from the steam-drum 3.

18 and 19 are valves in the pipes 9 and 17, respectively.

The tank 7 has a gage 20, indicating the surface-level of the liquid 21 within it.

22 is a pipe leading from the bottom of the tank 7 to one or more of the rendering-tanks 1, and having a valve 23, by which it may be closed, but which may be opened to allow the liquid within it to gravitate into the rendering-tank. The purpose of the tank is to receive and hold any liquid which may be carried over from a rendering-tank to the tank 7 of the liquid gravitating to the bottom of the tank 7 and the gaseous material passing out through the pipe 9. When discharging the liquid from the tank 7 to a rendering-tank, the valve 18 would usually be closed.

I claim as my invention—

1. The combination, with the steam-boiler and furnace, of a rendering-tank, the pipe 2, connecting the steam-space of said boiler with the lower end of said tank, a settling-tank, an independent pipe 6, connecting the upper end of said rendering-tank directly with the upper interior of said settling-tank, an injector discharging into said furnace, an independent pipe 9 connecting the upper interior of said settling-tank directly with said injector, the steam-pipe 17, connecting the injector with the boiler, the pipe 22, having a cock connecting the lower interior of the settling-tank with the lower part of the rendering-tank, and the cock 18 in the pipe 9, all substantially as and for the purposes set forth.

2. The combination, with the steam-boiler and furnace, of a rendering-tank, a pipe connecting said tank with said boiler, a settling-tank, a pipe connecting the upper interior of said settling-tank with the upper interior of the rendering-tank, an injector connected with said boiler and furnace, and an independent pipe connecting the upper interior of the settling-tank with said injector, whereby a continuous flow of gas from the rendering-tank to the boiler through said settling-tank is maintained, substantially as described.

3. The combination, with the rendering-tank having a steam-pipe connected thereto, and the settling-tank having its upper end connected with the upper end of said rendering-tank, of a pipe having a cock leading from the top of the settling-tank, and the pipe 22, connecting the lower end of the settling-tank with the lower end of the rendering-tank, substantially as and for the purposes set forth.

MICHAEL A. FOSTER.

Witnesses:
  SAML. KNIGHT,
  EDW. S. KNIGHT.